[United States Patent Office — 3,202,674 — Patented Aug. 24, 1965]

3,202,674
PHENETHYLAMINE DERIVATIVES
Andre L. Langis, St. Laurent, Quebec, and Marie-Genevieve Paule Stegen, Montreal, Quebec, Canada, assignors to American Home Products Corporation, New York, N.Y., a corporation of Delaware
No Drawing. Filed May 24, 1961, Ser. No. 112,197
Claims priority, application Canada, Mar. 5, 1960, 793,895; Mar. 3, 1961, 818,303
1 Claim. (Cl. 260—309.6)

This application is a continuation-in-part of our copending application Serial No. 92,123, filed February 28, 1961, now abandoned.

This invention relates to phenethylamine derivatives and their preparation.

More particularly, it relates to phenethylamine derivatives of the general formula

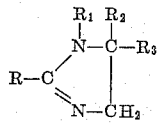

in which R is selected from the group consisting of alkyl, aryl, aralkyl, hydroxy substituted aralkyl, alkoxy substituted aralkyl, alkyl substituted aralkyl, phenoxy methyl, alkoxy substituted phenoxy methyl, alkoxy benzyl, cycloalkenyl and pyridyl. $R_1$ is aralkyl, $R_2$ is selected from the group consisting of alkyl and aryl, and $R_3$ is selected from the group consisting of hydrogen and lower alkyl.

Also included in the invention are the pharmacologically acceptable salts, intermediates and methods of preparation.

The phenethylamine derivatives of the invention are pharmacologically active, being especially useful as bronchodilators and antihistaminic agents for humans or animals. As such, they are equivalent to their pharmacologically water-soluble acceptable salts which may be administered orally or by subcutaneous injection or in aerosol form. Other compounds of the invention are useful as intermediates in the preparation of the pharmacologically active compounds.

When administered orally, subcutaneously, or as an aerosol, the antihistaminic activity of the active compounds may be demonstrated in vivo by the guinea pig aerosol test, described by O. H. Siegmund, J. Pharmacol. Exp. Therap., vol. 90, p. 254 (1947) and in vitro by the equally well-known test of Magnus on the isolated guinea pig ileum. The bronchodilator activity may be shown in the cat, using the test method of Konzett described in Arch. für Exper. Pathol. Pharmakol., vol. 195, p. 71 (1940) and by the guinea pig aerosol test mentioned above.

Further advantages of the active compounds are that they do not act like the sympathomimetic amines and their salts, as may readily be demonstrated in tests on the spontaneous activity of the isolated rat uterus or the guinea pig ileum. Neither do they cause the damage to the heart characteristic of the catecholamines, no significant effects on heart rate or blood pressure being demonstrable in the dog, nor any evidence of tachycardia.

Other advantages of the above compounds and of their water-soluble, pharmacologically acceptable salts are that they cause neither stimulation nor depression, and that they possess bronchodilator activity of long duration after oral administration.

The compounds of the invention may be produced by the following process.

A substituted amine of the formula $R_1$—$NH_2$ in which $R_1$ is aralkyl, is condensed with an aldehyde or a ketone of the formula

in which $R_2$ is selected from the group consisting of lower alkyl and aryl, and $R_3$ is selected from the group consisting of hydrogen and methyl, in the presence of cyanide ions, to obtain a substituted amino nitrile of the formula

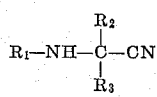

in which $R_1$, $R_2$ and $R_3$ are as defined above.

The latter nitrile is reduced preferably with lithium aluminum hydride to obtain a substituted diamine of the formula

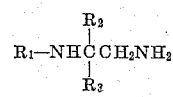

in which $R_1$, $R_2$ and $R_3$ are as defined above. The latter compound is reacted with an acid or its corresponding lower alkyl ester of the general formula

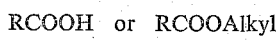

RCOOH or RCOOAlkyl in which R is as defined above.

If the reaction mixture is heated at 230° C. to 250° C. for thirty minutes and not subjected to distillation, there is obtained a mixture of a substituted acetamide of the general formula

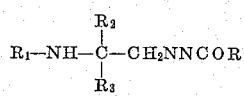

in which R, $R_1$, $R_2$, and $R_3$ are as defined above, and a corresponding substituted imidazoline of the general formula mentioned above. The above mixture may be converted to a mixture of the corresponding hydrohalides, preferably the hydrochlorides, by conventional means, and the active imidazoline as a non-toxic salt may then be derived in several different ways as follows.

For example, the mixture of hydrohalides may be separated by fractionated crystallization to remove the substituted acetamide and then treated with a weak base to obtain the substituted imidazoline as a base. The latter may be in turn converted to a non-toxic salt.

Alternatively, the mixture of the substituted diamine of the above formula with an acid or its lower alkyl ester of the formula mentioned above may be heated, preferably for from one to two hours, at a temperature of from 230° C. to 250° C., whereupon the substituted acetamide of the formula mentioned above is substantially converted into the correspondingly substituted imidazoline so that almost the entire yield is of the latter.

In an alternative procedure, the substituted acetamide of the formula mentioned above may be isolated and heated at 230° C. to 250° C. to convert it to the correspondingly substituted imidazoline.

In a still further procedure the step of condensing the substituted diamine of the formula mentioned above with an acid or its corresponding lower alkyl ester of the formula mentioned above may be carried out as follows. The substituted diamine is heated, preferably at a temperature of from 230° C. to 250° C. for from one-half hour to two hours, followed by distillation, thereby to convert the resulting reaction product completely to a correspondingly substituted imidazoline of the general formula mentioned above.

The invention also includes as new products the intermediates described herein and the dihydrohalides thereof, preferably the hydrochlorides.

For use as pharmacologically active substances the imidazolines of this invention, in the form of pharmacologically acceptable salts, preferably the hydrochlorides, may be compounded in a known manner to form novel compositions. For example, they can be put up with pharmaceutically acceptable carriers. Such carriers are commonly made up of starch, lactose, aluminum and magnesium stearates and possibly other functional agents. The mixture may be prepared and granulated, ground and pressed into tablets in the usual manner. For subcutaneous or aerosol use, the material may be put up in a sterile aqueous isotonic solution.

A number of the compounds of this invention possess an asymmetric carbon atom and may be resolved into their optically active enantiometers. One of the compounds of this invention corresponding to the generic formula mentioned above in which R is benzyl, $R_1$ is phenethyl, $R_2$ is methyl and $R_3$ is hydrogen, has been smoothly dehydrogenated, introducing a double bond between carbon atoms 4 and 5 to give the corresponding imidazole of the following formula

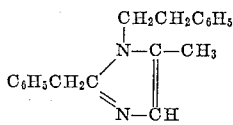

The following examples describe preferred procedures which further illustrate the invention.

EXAMPLE 1

*Alpha (2-phenethylamino) propionitrile III*

104.06 g. (1 mole) of sodium bisulfite are dissolved in 500 cc. of water. The solution is cooled to 10° C. and 44.05 g. (1 mole) of acetaldehyde is added dropwise maintaining the temperature of the reaction mixture at 15–16° C. 121 g. (1.0 mole) of beta-phenethylamine are then added dropwise to the sodium bisulfite addition product. A solution of 65.12 g. (1.0 mole) of potassium cyanide in 250 ml. of water is then added to the solution which is kept at a temperature of 15–16° C. throughout the addition.

The reaction mixture is then allowed to stir at room temperature for a period of two hours. A thick oil forms on the surface and is extracted with benzene. The benzene extract is washed with water, dried over sodium sulfate and the benzene evaporated under reduced pressure. The yellow oil so obtained is distilled under vacuum. Yield: 112 g., B.P. 133° C. at 14 mm.

EXAMPLE 2

*2-(beta-phenethylamino) propylamine dihydrochloride IV*

100 g. of alpha-(2-phenethylamino) propionitrile dissolved in 100 cc. of dry ether are added dropwise to a mixture of 23.0 g. of lithium aluminum hydride in 250 ml. of ether. The mixture is heated to reflux for a period of one hour. 53 ml. of water are then added dropwise to the mixture which has been previously cooled in an ice and water bath. The inorganic salts are filtered off, the ether evaporated under reduced pressure and the residue distilled under vacuum. Yield: 62 g., B.P. 138–140° C., at 8 mm. A 5 g. sample of this material is dissolved in 50 ml. of ether and the solution poured in cold ethereal hydrogen chloride. The crystals are filtered off and recrystallized from a methanol and isopropanol mixture. Yield: 4.5 g., M.P. 222–223° C.

Calculated for $C_{11}H_{20}N_2Cl_2$: N, 11.15%; Cl, 28.2%. Found: N, 11.02%; Cl, 28.34%.

EXAMPLE 3

*1-beta-phenethyl-2-benzyl-5-methyl imidazoline hydrochloride IV*

17.8 g. of 2-(beta-phenethylamino) propylamine and 16.4 g. of ethyl phenylacetate are heated at 240–245° C. for a period of one hour and the ethanol is distilled off as it forms. The reaction mixture is cooled and the thick oily residue is distilled under high vacuum. Yield: 10.0 g., B.P. 166–168° C., at 0.18 mm. The product is dissolved in 250 ml. of dry ether and poured in cold ethereal hydrogen chloride. The precipitate is filtered off and recrystallized from acetone and methanol mixture. Yield: 7.8 g., M.P. 198–200° C.

Calculated for $C_{19}H_{24}N_2O \cdot HCl$: C, 68.8%; H, 7.58%; phenylacetamide as a colorless oily residue.

EXAMPLE 4

*N-beta-(2-phenethylamino)propyl phenylacetamide hydrochloride V and 1-(beta-phenethyl)-2-benzyl-5-methyl imidazoline VI*

A mixture of 2-(beta-phenethylamine) propylamine IV (387 g.) and ethyl phenylacetate (356 g.) is warmed at 245° C. for a period of 30 minutes. When all the ethanol has distilled over, the oily residue is cooled and compounds V and VI are separated by conversion to the hydrochloride.

(a) *Isolation of 1-(beta-phenethyl)-2-benzyl-5-methyl imidazoline hydrochloride VI.*—The liquid residue obtained above (546 g.) is dissolved in 1 litre of acetone and treated with 3.5 litres of a saturated ethereal hydrogen chloride solution. The mixture of crystalline hydrochlorides which separates is collected and recrystallized three times from a methanol acetone mixture to give 146 g. of compound VI. The more soluble compound V remains in solution and is isolated as described below:

Compound VI M.P. 197–198° C.—Calculated for $C_{19}H_{22}N_2 \cdot HCl$: C, 72.3%; H, 7.37%; N, 8.90%; Cl, 11.28%. Found: C, 72.0%; H, 7.19%; N, 8.68%; Cl, 11.27%.

(b) *Free base of VI.*—A solution of 157 g. of compound VI hydrochloride in 2 litres of water is treated with 60 g. of sodium carbonate and extracted with benzene. Distillation of the benzene extract under the high vacuum gives 130 g. of a colorless liquid, B.P. 165° C. at 0.2 mm.

Calculated for $C_{19}H_{22}N_2$: C, 81.9%; H, 7.98%; N, 10.07%. Found: C, 80.9%; H, 7.95%; N, 10.18%.

(c) *Isolation of N-(beta-2-phenethylamino)-propyl phenylacetamide HCl V.*—The methanol acetone which remains after removal of compound V is concentrated under vacuum to remove the solvent and the residue so obtained after two recrystallizations from water gives 70.0 g. of compound V, M.P. 143–145° C.

Calculated for $C_{19}H_{24}N_2O \cdot HCl$: C, 68.8%; H, 7.58%; N, 8.43%; Cl, 10.6%. Found: C, 68.4%; H, 7.52%; N, 8.47%; Cl, 10.6%.

(d) *Free base of compound V.*—Two grams of the above hydrochloride are treated with 50 ml. 14% aqueous ammonia solution, extracted with ether, and the solvent evaporated, yielding N-beta-(2-phenethylamino)-propyl phenylacetamide as a colorless oily residue.

EXAMPLE 5

*Conversion of compound V to compound VI*

Compound V (8.17 g.) is heated at 250–260° C. for one hour removing the water as it forms. The liquid residue is dissolved in ether and treated with an ethereal hydrogen chloride solution. The solid which is formed is collected and recrystallized from an acetone methanol mixture. Yield: 6.5 g. of 1-beta-phenethyl-2-benzyl-5-methyl-imidazoline hydrochloride (R–9528), M.P. 196–197° C.

EXAMPLE 6

*1-(beta-phenethyl)-2-benzyl-5-methyl-imidazoline hydrobromide*

When dissolving 2 g. of the residue obtained as above after heating compound V in 25 ml. of ether and treating with 5 ml. 48% hydrobromic acid the colorless crystalline N-(beta-phenethyl)-2-benzyl-5-methyl-imidazoline hydrobromide is obtained a sample of which, after recrystallization from methanol melts at 216–217° C.

EXAMPLE 7

*1-(beta-phenethyl)-2-benzyl-5-methyl-imidazoline*

The racemic form of that compound has been prepared according to the method described in our copending patent application, Serial No. 92,123. It was separated into its two optical isomers, the laevo form (1a) and the dextro form (1b) as follows:

(a) *Laevo-1-(beta-phenethyl)-2-benzyl-5-methylimidazoline.*—31.4 grams (0.10 mole) of the racemic form of 1-(beta-phenethyl) - 2-benzyl-5-methylimidazoline hydrochloride were dissolved in water and converted to the corresponding free base by the addition of 4.0 grams of sodium hydroxide. The free base was extracted with ether and the ether extract dried over sodium sulfate.

11.6 grams (0.05 mole) of dextro-10-camphorsulfonic acid dissolved in 50 ml. of methanol were added to the ether solution obtained above. The dextro-1-camphorsulfonate was then precipitated by the addition of more ether. The product was recrystallized from isopropanol. 19.5 grams of pure dextro-10-camphorsulfonic acid salt were obtained in this manner.

The camphorsulfonic acid salt was then treated with dilute sodium hydroxide solution and the free base was extracted with ether. The free base was converted to the corresponding hydrochloric acid salt by conventional method. 11.9 grams of laevo-1-(beta-phenethyl)-2-benzyl-5-methylimidazoline hydrochloride, having a rotation of $[a]_D^{24}$ −94°, were obtained in this manner.

(b) *Dextro-1-(beta-phenethyl)-2-benzyl-5-methylimidazoline.*—To the mother liquor obtained after the precipitation of the above dextro-camphorsulfonate salt was added another 0.05 mole of dextro-10-camphorsulfonic acid and the (+) rotating isomer was precipitated in the same manner as the (−) rotating one. After several recrystallizations from isopropanol pure dextro-camphorsulfonate salt was obtained. It was converted to the corresponding hydrochloric acid salt and 3.0 grams of dextro-1-(beta-phenethyl)-2-benzyl-5-methylimidazoline hydrochloride R–9578 having the following rotation $[a]_D^{24}$ +94° were obtained.

EXAMPLE 8

*1-(beta-phenethyl)-2-phenyl-5-methylimidazoline*

By following the method described in Example 3 of our copending patent application above-identified, but using 35.6 grams (0.2 mole) of 2-(beta-phenethylamino) propylamine and 30.0 grams (0.2 mole) ethyl benzoate, heating at 230° C. for two hours, distilling off ethanol and water as they were formed, cooling the reaction mixture and distilling it under high vacuum, there were obtained 23.0 grams of the title compound B.P. 170–172° C. at 0.28 mm. Hg. The compound was identified by analysis of the picrate salt, M.P. 148–149° C.

Calculated for $C_{18}H_{20}N_2 \cdot (NO_2)_3C_6H_2OH$: C, 58.42%; H, 4.70%; N, 14.19%. Found: C, 59.13%; H, 4.32%; N, 14.36%.

EXAMPLE 9

*1-(beta-phenethyl)-2-(beta-phenethyl)-5-methylimidazoline*

Following the method described in Example 8, but using 35.6 grams (0.2 mole) of 2-(beta-phenethylamino) propylamine and 36.0 grams (0.2 mole) of ethyl hydrocinnamate, heating at 260° C. for two hours and working up as above, there were obtained 26.3 grams of the title compound, B.P. 150–152° C. at 0.04 mm. Hg, identified as the picrate salt, M.P. 122–124° C.

Calculated for $C_{20}H_{24}N_2 \cdot (NO_2)_3C_6H_2O_4$: C, 59.90%; H, 5.22%. Found: C, 59.91%; H, 5.08%.

EXAMPLE 10

*1-(beta-phenethyl)-2-(3-pyridyl)-5-methylimidazoline*

Following the method described in Example 8, but using 35.6 grams (0.2 mole) of 2-(beta-phenethylamino) propylamine and 30.2 grams (0.2 mole) of ethyl nicotinate, heating at 260° C. for two hours, and working up as above, there were obtained 30.5 grams of the title compound, B.P. 176–178° C. at 0.05 mm. Hg identified as the picrate salt, M.P. 150–151° C.

Calculated for $C_{17}H_{19}N_3 \cdot (NO_2)_3C_6H_2OH$: C, 55.87%; H, 4.48%; N, 17.00%. Found: C, 56.16%; H, 4.31%; N, 17.00%.

EXAMPLE 11

*1-(beta-phenethyl)-2-(o-hydroxyphenylmethyl)-5-methylimidazoline hydrochloride*

Following the method described in Example 8 but using 15.0 grams of 2-(beta-phenethylamino) propylamine and 15.0 grams of o-hydroxyphenylethylacetate, heating at 190° C. for one half hour, distilling off water and ethanol as they were formed, cooling the reaction mixture to room temperature, dissolving it in a warm solution of hydrochloric acid in ethanol, cooling, and recrystallizing from a mixture of isopropanol and methanol, yielded 13.8 grams of the title compound, M.P. 233–234° C.

Calculated for $C_{19}H_{22}N_2O \cdot HCl$: N, 8.46%; Cl, 10.71%. Found: N, 7.91%; Cl, 11.03%.

EXAMPLE 12

*1-(beta-phenethyl)-2-p-hydroxyphenylmethyl-5-methylimidazoline hydrochloride*

Following the method described in Example 8, but using 10.0 grams of 2-(beta-phenethylamino) propylamine and 10.0 grams ethyl p-hydroxyphenyl ethylacetate heating at 220° C. for two hours, distilling off water and ethanol as they were formed, cooling the reaction mixture, dissolving it in ether, pouring it in cold ethereal hydrocarbon chloride, and recrystallizing from a mixture of isopropanol and ethanol, there were obtained 9.0 grams of the title compound, M.P. 234–235° C.

Calculated for $C_{19}H_{22}N_2O \cdot HCl$: N, 8.46%; Cl, 10.71%. Found: N, 8.31%; Cl, 10.56%.

EXAMPLE 13

*1-(beta-phenethyl)-2-(3',4'-dihydroxybenzyl)-5-methylimidazoline*

Following the method described in Example 8, but using 9.2 grams of 2-(beta-phenethylamino) propylamine and 10.0 grams of 3,4-dimethoxyphenylacetic acid, heating at 250° C. for thirty minutes and working up as described in Example 8, there were obtained 15.1 grams of 1-(beta-phenethyl)-2-(3',4'-dihydroxybenzyl)-5-methylimidazoline, B.P. 180–182° C. at 0.3 mm. Hg. The methoxy groups in that compound were removed by hydrolysis by dissolving 4.53 grams of the compound in 25 ml. of 48% hydrobromic acid, heating at reflux for eight hours, cooling, and recrystallizing from isopropanol, obtaining 2.4 grams of the hydrobromide salt of the title compound, M.P. 225–226° C.

Calculated for $C_{19}H_{22}N_2O_2 \cdot HBr$: N, 7.16%; Br., 20.42%. Found: N, 6.92%; Br. 20.36%.

EXAMPLE 14

*1-(beta-phenethyl)-2-(3'-methoxybenzyl)5-methylimidazoline*

Following the method described in Example 8 but using 26.7 grams (0.15 mole) of 2-(beta-phenethylamino) propylamine and 25.0 grams (0.15 mole) of m-methoxyphenylacetic acid, heating at 250° C., for one hour and working up as described in Example 8, there were obtained 35.3 grams of the title compound, B.P. 208–211° C. at 0.07 mm. Hg, identified as the picrate salt, M.P. 129–130° C.

Calculated for $C_{20}H_{24}N_2O.(NO_2)_3C_6H_2OH$: N, 13.03%. Found: N, 13.08%.

EXAMPLE 15

1-(beta-phenethyl)-2-(4'-methylbenzyl)-5-methylimidazoline

Following the method of Example 8, but using 28.5 grams (0.16 mole) of 2-(beta-phenethylamino) propylamine and 25.0 grams (0.16 mole) of p-tolylacetic acid, heating at 260° C. for one hour, and working up as above, there were obtained 30.0 grams of the title compound, B.P. 192–196° C. at 0.1 mm. Hg, identified as the picrate salt, M.P. 129–130° C.

Calculated for $C_{20}H_{24}N_2.(NO_2)_3C_6H_2OH$: N, 13.43%. Found: N, 13.43%.

EXAMPLE 16

1-(beta-phenethyl)-2-(2',4',6'-trimethylbenzyl)-5-methylimidazoline

Following the method of Example 8, but using 22.2 grams (0.13 mole) 2-(beta-phenethylamino) propylamine and 23.0 grams (0.13 mole) of mesitylacetic acid, heating at 275° C. for one hour, and working up as above there were obtained 21.1 grams of a title compound, B.P. 181–184° C. at 0.1 mm. Hg, identified as the picrate salt, M.P. 152–154° C.

Calculated for $C_{22}H_{28}N_2.(NO_2)_3C_6H_2OH$: N, 12.74%. Found: N, 12.72%.

EXAMPLE 17

1-(beta-phenethyl)-2-phenoxymethyl-5-methylimidazoline

Following the method of Example 8, but using 35.6 grams of 2-(beta-phenethylamino) propylamine and 30.4 grams of phenoxyacetic acid, heating at 245–255° C. for 45 minutes and working up as above, there were obtained 37.0 grams of the title compound, B.P. 180–184° C. at 0.15 mm. Hg, identified as the hydrochloride salt, M.P. 146–149° C.

Calculated for $C_{19}H_{22}N_2O.HCl$: N, 8.47%; Cl, 10.72%. Found: N, 8.28%; Cl, 10.64%.

EXAMPLE 18

1-(beta-phenethyl)-2-(4'-methoxyphenoxymethyl)-5-methylimidazoline

Following the method of Example 8, but using 17.8 grams of 2-(beta-phenethylamino) propylamine and 18.2 grams of p-methoxyphenoxyacetic acid, heating at 230–250° C. for thirty minutes, and working up as above, there were obtained 21.8 grams of the title compound, B.P. 180–190° C. at 0.15 mm. Hg, identified as the picrate salt, M.P. 130–132° C.

Calculated for $C_{20}H_{24}N_2O_2.2,4,6(NO_2)_3C_6H_2OH$: C, 56.43%; H, 4.92%; N, 12.64%. Found: C, 56.93%; H, 4.54%; N, 12.39%.

EXAMPLE 19

1-(beta-phenethyl)-2-(D,L-methoxybenzyl)-5-methylimidazoline

Following the method of Example 8, but using 17.8 grams of 2-(beta-phenethylamino) propylamine and 16.62 grams of DL-methoxyphenylacetic acid, heating at 230° C. for thirty minutes, and working up as above, there were obtained 20.6 grams of the title compound, B.P. 167–170° C. at 0.35 mm. Hg, identified as the picrate salt, M.P. 132–134° C.

Calculated for $C_{20}H_{24}N_2O.2,4,6(NO_2)_3C_6H_2OH$: C, 58.11%; H, 5.06%; N, 13.02%. Found: C, 58.2%; H, 5.06%; N, 13.02%.

EXAMPLE 20

1-(beta-phenethyl)-2-ethyl-5-methylimidazoline

Following the method of Example 8, but using 17.8 grams of 2-(beta-phenethylamino) propylamine and 7.4 grams of propionic acid, heating at 230° C. for thirty minutes, and working up as above, there were obtained 12.6 grams of the title compound, B.P. 150–153° C. at 0.35 mm. Hg, identified as the picrate salt, M.P. 144–145° C.

Calculated for $C_{14}H_{20}N_2.2,4,6(NO_2)_3C_6H_2OH$: N, 15.72%. Found: N, 15.55%.

EXAMPLE 21

1-(beta-phenethyl)-2-(n-hexyl)-5-methylimidazoline

Following the method of Example 8, but using 35.6 grams of 2-(beta-phenethylamino) propylamine and 26.03 grams of n-heptanoic acid, heating at 225–235° C. for two hours, and working up as above, there were obtained 35.0 grams of the title picrate salt, M.P. 87–89° C.

Calculated for $C_{18}H_{28}N_2.2,4,6(NO_2)_3C_6H_2OH$: N, 13.97%. Found: N, 14.01%.

EXAMPLE 22

1(beta-phenethyl)-2-(Δ²-cyclopentenylmethyl)-5-methylimidazoline

Following the method of Example 8, but using 35.6 grams of 2-(beta-phenethylamino) propylamine and 25.0 grams of Δ²-cyclopentenylacetic acid, heating at 235° C. for thirty minutes, and working up as above, there were obtained 36.5 grams of the title compound, B.P. 159–161° C. at 0.18 mm. Hg, identified as the picrate salt, M.P. 113–114° C.

Calculated for $C_{18}H_{24}N_2.2,4,6(NO_2)_3C_6H_2OH$: N, 14.08%. Found: N, 14.09%.

EXAMPLE 23

1-(beta-phenethyl)-2-naphthylmethyl-5-methylimidazoline

Following the method of Example 8, but using 23.2 grams of 2-(beta-phenethylamino) propylamine and 25.0 grams of 1-naphthylacetic acid, heating at 250° C. for thirty minutes, and working up as above, there were obtained 33.3 grams of the title compound, B.P. 220–222° C. at 0.28 mm. Hg, identified as the picrate salt, M.P. 172–173° C.

Calculated for $C_{23}H_{24}N_2.2,4,6(NO_2)_3C_6H_2OH$: N, 12.56%. Found: N, 12.66%.

EXAMPLE 24

(a) *Alpha-(3-phenylpropylamino) propionitrile.*—18.5 grams (0.14 mole) of 3-phenylpropylamine were added portionwise to 10.0 grams (0.14 mole) of lactonitrile. The reaction mixture was cooled with an ice and water mixture in between each addition. The mixture was left standing at room temperature for twenty hours. 150 cc. of ether were added and the two layers were separated. The ether layer was washed with water, dried over sodium sulfate and evaporated under reduced pressure. The oily residue was distilled under vacuum. Yield: 25.5 grams, B.P. 134–136° C. at 18 mm. A sample of the hydrochloric acid salt of this material was prepared for analytical purposes, M.P. 146–148° C.

Calculated for $C_{12}H_{16}N_2.HCl$: C, 64.13%; H, 7.62%. Found: C, 64.12%; H, 7.75%.

(b) *2 - (3 - phenylpropylamino) propylamine.*—12.16 grams (0.32 mole) of lithium aluminum hydride were suspended in 250 ml. of dry ether. 42.7 grams (0.32 mole) of anhydrous aluminum chloride dissolved in 300 ml. of dry ether were added rapidly through a dropping funnel to the reaction mixture. After stirring for five minutes, 60 grams (0.32 mole) of alpha-(3-phenylpropylamino) propionitrile dissolved in 250 ml. of dry ether were added dropwise maintaining the temperature of the reaction mixture below the boiling point of ether. The mixture was stirred at room temperature for one hour after which 50 ml. of water followed by 455 ml. of 6 N hydrosulfuric acid were added dropwise. 325 ml. of water were added to the mixture, the two layers were separated and the aqueous fraction was extracted with ether. The aqueous layer was then brought back to pH 11 with potassium hydroxide and the diamine was extracted with ether. The ether extract was dried over sodium sulfate and evaporated to dryness under reduced pressure. Yield: 35.2 grams. B.P. 160–172° C. at 24 mm. A sample of the hydrochloride of this material was prepared for analytical purposes, M.P. 199–201° C.

Calculated for $C_{12}H_{20}N_2 \cdot 2HCl$: N, 26.74%. Found: N, 27.74%.

(c) *1-(3-phenylpropyl)-2-benzyl-5-methylimidazoline.*—Following the method of Example 8, but using 35.2 grams (0.18 mole) of 2-(3-phenylpropylamino) propylamine and 29.5 grams (0.18 mole) of ethyl phenylacetate, heating at 270° C. for two hours, and working up as above, there were obtained 33.9 grams of the title compound, B.P. 178–186° C. at 0.02 mm. Hg, identified as the picrate salt, M.P. 124–126° C.

Calculated for $C_{20}H_{24}N_2 \cdot (NO_2)_3C_6H_2OH$: N, 13.43%. Found: N, 13.99%.

EXAMPLE 25

(a) *Alpha-(1-methyl-2-phenethylamino) propionitrile.*—190.0 grams (1.41 mole) of amphetamine were added portionwise to 101.1 grams (1.41 mole) of lactonitrile cooling the solution between each addition. The reactants were left standing at room temperature for two hours and then they were heated on a steam bath for one hour. 250 cc. of ether were added to the mixture and the water layer was separated off. The ether fraction was dried over sodium sulfate and the solvent evaporated under reduced pressure. The residue was distilled under vacuum. Yield: 166.6 grams, B.P. 114–117° C. at 23 mm.

(b) *2-(alpha-methyl-beta-phenethylamino) propylamine.*—166.0 grams of alpha (1-methyl-2-phenethylamino) propionitrile were added dropwise to a suspension of 35.0 grams of lithium aluminum hydride in 500 grams of ether maintaining the temperature of the reactants below 10° C. Stirring at 10° C. was continued for an additional two hours. 77.0 ml. of water were added dropwise, the inorganic salts were filtered off and the solvent was evaporated under reduced pressure. Yield: 44.8 grams, B.P. 145–147° C. at 15 mm. A sample of the hydrochloric acid salt of this material was prepared for analytical purposes, M.P. 254–256° C.

Calculated for $C_{12}H_{20}N_2 \cdot 2HCl$: N, 11.34%; Cl, 28.69%. Found: N, 10.88%; Cl, 27.28%.

(c) *1-(alpha-methyl-beta-phenethyl)-2-benzyl-5-methylimidazoline.*—Following the method of Example 8, but using 37.6 grams (0.2 mole) of 2-(alpha-methyl-beta-phenethylamino) propylamine and 27.2 grams (0.2 mole) of phenylacetic acid, heating at 260° C. for thirty minutes, and working up as above, there were obtained 24.5 grams of the title compound, B.P. 208–211° C. at 0.8 mm. Hg, identified as the hydrochloride salt, M.P. 224–226° C.

Calculated for $C_{20}H_{24}N_2 \cdot HCl$: N, 8.52%; Cl, 10.77%. Found: N, 8.15%; Cl, 10.65%.

EXAMPLE 26

(a) *2-beta-phenethylaminobutyronitrile.*—104.1 grams (1.0 mole) of sodium bisulfite were dissolved in 250 ml. of water. The solution was cooled to 10° C. and 58.1 grams (1.0 mole) of propionaldehyde were added dropwise maintaining the temperature of the reaction mixture below 15° C. 121.0 grams (1.0 mole) of beta-phenethylamine were then added dropwise to the sodium bisulfite addition product. Finally a solution of 65.2 grams (1.0 mole) of potassium cyanide in 150 ml. of water was added dropwise to the solution which was kept at room temperature throughout the addition. The mixture was stirred at room temperature for one hour. The oily layer was extracted with benzene, the benzene extract was then washed with water and dried over sodium sulfate. The benzene was then evaporated under reduced pressure. Yield: 168 grams of crude material. We used the nitrile in the crude form for the next reaction because there was considerable decomposition when we tried to distill it.

(b) *2-beta-phenethylaminobutylamine.*—168.0 grams of crude 2-beta-phenethylaminobutyronitrile were added dropwise to a mixture of 3.80 grams (1.0 mode) of lithium aluminum hydride in 500 ml. of dry ether keeping the temperature of the reaction mixture below 10° C. The mixture was then stirred at room temperature for thirty minutes. 40 ml. of water followed by 50 ml. of 20% sodium hydroxide solution and another 25 ml. of water were added dropwise. The inorganic salts were filtered on a Buchner funnel and the ether evaporated under reduced pressure. The residue was then distilled under vacuum. Yield: 94.8 grams, B.P. 160–165° C. at 20 mm. A sample of the hydrochloric acid salt of this material was prepared for analytical purposes, M.P. 206–208° C.

Calculated for $C_{12}H_{20}N_2 \cdot 2HCl$: N, 10.57%. Found: N, 10.41%.

(c) *1-beta-phenethyl-2-benzyl-5-ethylimidazoline.*—Following the method of Example 8, but using 94.8 grams (0.5 mole) of 2-beta-phenethylaminobutylamine and 68.0 grams (0.5 mole) of phenylacetic acid, heating at 250° C. for one hour, and working up as above, there were obtained 88.9 grams of the racemic form of the title compound, B.P. 170–176° C. at 0.04 mm. Hg, identified as the hydrochloride salt, M.P. 172–174° C.

Calculated for $C_{20}H_{24}N_2 \cdot 2HCl$: N, 8.52%; Cl, 10.78%. Found: N, 8.40%; Cl, 10.82%.

(d) *Laevo-1-beta-phenethyl-2-benzyl-5-ethylimidazoline.*—88.9 grams (0.30 mole) of racemic 1-beta-phenethyl-2-benzyl-5-ethylimidazoline as obtained above was dissolved in 100 cc. of hot isopropanol. A solution of 35.6 grams (0.15 mole) of dextro-10-camphorsulfuric acid dissolved in 50 ml. of hot isopropanol was added to the imidazoline solution. The mixture was cooled and the crystalline salt was filtered on a Buchner funnel and dried. Yield: 66.6 grams, M.P. 197–205° C. The product was recrystallized from isopropanol. Yield: 56.4 grams, M.P. 208–210° C. This material was converted to the free base by treatment with base and the hydrochloric acid salt prepared by the conventional method. Yield: 26.3 grams, M.P. 169–171° C., $[\alpha]_D^{24}$ −109.3

EXAMPLE 27

(a) *Alpha-(2-phenethylamino) valeronitrile.*—52.03 grams (0.50 mole) of sodium bisulfite were dissolved in 250 ml. of water. 31.0 grams (0.50 mole) of butyraldehyde were added dropwise maintaining the temperature of the reaction mixture below 35° C. 60.5 grams (0.5 mole) of beta-phenethylamine were then added dropwise to the sodium bisulfite addition product. Finally a solution of 32.6 grams (0.50 mole) of potassium cyanide in 120 ml. of water was added dropwise. The solution was stirred at room temperature for two hours. The product was extracted with benzene, the benzene extract was washed with water and dried over sodium sulfate. The solvent was evaporated under reduced pressure. The residue was distilled under vacuum. Yield: 26.7 grams. B.P. 138–148° C. at 20 mm.

(b) *2-(beta-phenethylamino) valerylamine.*—26.7 grams (0.13 mole) of alpha (2-phenethylamino)-valeronitrile dissolved in 100 ml. of dry ether were added dropwise to a mixture of 5.0 grams (0.13 mole) lithium aluminum hydride in 500 ml. of ether maintaining the temperature of the reaction mixture below 10° C. The mixture was then stirred at room temperature for thirty minutes. 5 ml. of water followed by 10 ml. of 20% sodium hydroxide solution and another 5 ml. of water were added dropwise maintaining the temperature of the mixture below 10° C. throughout the addition. The inorganic salts were filtered off and the solvent evaporated under reduced pressure. The residue was distilled under vacuum. Yield: 10.4 grams, B.P. 177–182° C. at 20 mm.

(c) *1-(beta - phenethyl) - 2 - benzyl - 5 - propylimidazoline.*—Following the method of Example 8, but using 9.4 grams (0.046 mole) of 2-(beta-phenethylamino) valerylamine and 6.3 grams (0.046 mole) of phenylacetic acid, heating at 250° C. for sixty minutes and working up as above, there were obtained 9.2 grams of the title compound, B.P. 169–171° C. at 0.03 mm. Hg, identified as the hydrochloride salt, M.P. 177–179° C.

Calculated for $C_{21}H_{26}N_2 \cdot HCl$: Cl, 10.34%. Found: Cl, 10.45%.

EXAMPLE 28

(a) *2-(beta-phenethylamino) - 3-methylbutyronitrile.*—104.1 grams (1.0 mole) of sodium bisulfite were dissolved in 500 cc. of water. 70.0 grams (1.0 mole) of isobutyraldehyde were added dropwise maintaining the temperature of the reaction mixture at 25° C. 121.0 grams (1.0 mole) of beta-phenethylamine were then added dropwise to the sodium bisulfite addition product. Finally a solution of 65.2 grams (1.0 mole) of potassium cyanide in 250 cc. of water was added dropwise while the reaction mixture was kept at room temperature. The mixture was stirred for two hours. The oily layer was extracted with benzene, the benzene extract was dried over sodium sulfate and the solvent evaporated under reduced pressure. The residue was distilled under vacuum. Yield: 54.0 grams, B.P. 145–149° C. at 30 mm. A sample of the hydrochloric acid salt of this material was prepared for analytical purposes, M.P. 143–145° C.

Calculated for $C_{13}H_{18}N_2 \cdot HCl$: N, 11.73%. Found: N, 11.23%.

(b) *2-(beta-phenethylamine) - 3-methylbutylamine.*—52.1 grams (0.258 mole) of 2-(beta-phenethylamino)-3-methylbutyronitrile dissolved in 50 ml. of dry ether were added dropwise to a mixture of 9.88 grams (0.26 mole) of lithium aluminum hydride in 500 ml. of ether maintaining the temperature of the reaction mixture below 10° C. The mixture was then stirred at room temperature for sixty minutes. The temperature of the reactants was then lowered to 10° C. and 10 ml. of water followed by 20 ml. of a 20% sodium hydroxide solution and finally by 5 ml. of water were added, dropwise. The inorganic salts were filtered off and the ether evaporated under reduced pressure. The residue was distilled under vacuum. Yield: 13.0 grams, B.P. 168–172° C. at 17 mm. A sample of the hydrochloric acid salt of this material was prepared for analytical purposes, M.P. 251–255° C.

Calculated for $C_{13}H_{22}N_2 \cdot 2HCl$: N, 10.11%. Found: N, 9.85%.

(c) *1-(beta-phenethyl) - 2 - benzyl - 5 - isopropylimidazoline.*—Following the method of Example 8, but using 12.0 grams (0.08 mole) of 2-(beta-phenethylamino)-3-methylbutylamine and 10.9 grams (0.08 mole) of phenylacetic acid, heating at 265° C. for thirty minutes, and working up as above, there were obtained 15.4 grams of the title compound, B.P. 190–200° C. at 0.08 mm. Hg, identified as the hydrochloride salt, M.P. 153–155° C.

Calculated for $C_{21}H_{26}N_2 \cdot HCl$: C, 73.57%; H, 7.94%; Cl, 10.34%. Found: C, 73.81%; H, 7.98%; Cl, 10.48%.

EXAMPLE 29

(a) *Alpha-(beta-phenethylamino) phenylacetonitrile.*—104.06 grams (1.0 mole) of sodium bisulfite were dissolved in 2,000 ml. of water. 106.1 grams (1.0 mole) of benzaldehyde were added dropwise maintaining the temperature of the reaction mixture below 30° C. 121.2 grams (1.0 mole) of beta-phenethylamine were added dropwise always maintaining the temperature of the reaction mixture below 30° C. A solution of 65.1 grams (1 mole) of potassium cyanide in 250 cc. of water was added dropwise. The reaction mixture was stirred at room temperature for one hour. The crystalline material was filtered on a Buchner funnel and dried in a vacuum oven. The product was recrystallized from methanol. Yield: 99.6 grams, M.P. 82–87° C.

(b) *2-(beta-phenethylamino) - 2 - phenethylamine.*—5 grams (0.13 mole) of lithium aluminum hydride were suspended in 130 ml. of dry ether. 17.3 grams (0.13 mole) of aluminum chloride (anhydrous) dissolved in 200 ml. of ether were added rapidly through a dropping funnel to the reaction mixture. After stirring for fifty minutes, 31 grams of alpha-(beta-phenethylamino) phenylacetonitrile dissolved in 250 ml. of dry ether were added dropwise keeping the temperature of the reaction mixture just below the boiling point of ether. The mixture was stirred at room temperature for one hour, after which 20 ml. of water were added dropwise. 182 ml. of 6 N hydrosulfuric acid were added dropwise followed by 130 ml. of water. The two layers were separated and the aqueous layer was extracted with ether. The aqueous layer was then brought to pH 11 with potassium hydroxide. The diamine was then extracted with ether, the ether extract dried over sodium sulfate and evaporated under reduced pressure. The oily residue was distilled under vacuum. Yield: 22.6 grams, B.P. 219–223° C. at 19 mm. A sample of the hydrochloric acid salt of this material was prepared for analytical purposes, M.P. 247–250° C.

Calculated for $C_{16}H_{20}N_2 \cdot 2HCl$: C, 61.34%; H, 7.08%; Cl, 22.64%. Found: C, 61.19%; H, 7.12%; Cl, 22.75%.

(c) *1-(beta-phenethyl) - 2 - benzyl - 5 - phenylimidazoline.*—Following the method described in Example 8, but using 19.0 grams (0.05 mole) of 2-(beta-phenethylamino)-2-phenethylamine and 8.2 grams (0.05 mole) of ethylphenylacetate, heating at 240–245° C. for two hours, and working up as above there were obtained 9.7 grams of the title compound, B.P. 222–224° C. at 0.03 mm. Hg, identified as the picrate salt, M.P. 126–128° C.

Calculated for $C_{24}H_{24}N_2 \cdot (NO_2)_3C_6H_2OH$: C, 63.26%; H, 4.78%; N, 12.30%. Found: C, 63.72%; H, 4.71%; N, 12.16%.

EXAMPLE 30

(a) *Alpha,alpha-dimethyl-(2-phenethylamino) acetonitrile.*—166.5 grams of sodium bisulfite were dissolved in 500 ml. of water. The solution was cooled to 10° C., and 45.24 grams of acetone were added dropwise maintaining the temperature of the reaction mixture at 15–16° C. 94.5 grams of beta-phenethylamine were then added dropwise to the sodium bisulfite addition product. Finally a solution of 104 grams of potassium cyanide in 150 cc. of water was added to the solution which was kept at room temperature throughout the addition. The mixture was stirred at 22° C. for two hours. The thick oil was then extracted with benzene 2×200 cc. The benzene extract was washed with water and then dried over sodium sulfate. The benzene was evaporated under reduced pressure and the residue distilled under vacuum. Yield 66 grams, B.P. 126–130° C. at 19 mm. A sample of the hydrochloric acid salt of this material was prepared for analytical purposes, M.P. 124–126° C.

Calculated for $C_{12}H_{16}N_2 \cdot HCl$: N, 12.46%; Cl, 15.77%. Found: N, 12.40%; Cl, 15.86%.

(b) *2 - (beta - phenethylamino) - 2 - methylpropylamine.*—73.3 grams of alpha,alpha-dimethyl-(2-phenethylamino) acetonitrile dissolved in 150 ml. of dry A.R. ether were added dropwise to a mixture of 15.2 grams of lithium aluminum hydride in 500 ml. of dry ether. The mixture was stirred at room temperature for a period of thirty minutes. 30 ml. of water were added dropwise to the reaction mixture. The inorganic salts were filtered off on a Buchner funnel and the ether evaporated under reduced pressure. The oily residue was distilled under vacuum. Yield: 23.5 grams, B.P. 142–148° C. at 13 mm. A sample of the hydrochloric acid salt of this material was prepared for analytical purposes, M.P. 257–259° C.

Calculated for $C_{12}H_{20}N_2 \cdot 2HCl$: Cl, 26.74%; N, 10.57%. Found: Cl, 27.17%; N, 10.53%.

(c) *1-(beta-phenethyl)-2-benzyl-5,5-dimethylimidazoline.*—Following the method of Example 8, but using 20.0 grams of 2-(beta-phenethylamino)-2-methylpropylamine and 16.4 grams of ethylphenylacetate, heating at 240–250° C. for one hour, and working up as above, there were obtained 19.8 grams of the title compound, B.P. 174–176° C. at 0.18 mm. Hg, identified as a hydrochloride salt, M.P. 229–232° C.

Calculated for $C_{20}H_{24}N_2 \cdot HCl$: N, 8.52%; Cl, 10.778%. Found: N, 8.09%; Cl, 11.32%.

EXAMPLE 31

(a) *Alpha-(2-phenethylamino) acetonitrile.*—104.1 grams (1.0 mole) of sodium bisulfite were dissolved in 500 ml. of water. The solution was cooled to 10° C., and 81.0 grams (1.0 mole) of formaldehyde (37% solution in water) were added dropwise maintaining the temperature of the reaction mixture at 15–16° C. 121 grams (1.0 mole) of beta-phenethylamine were then added dropwise to the sodium bisulfite addition product. Finally a solution of 65.12 grams (1.0 mole) of potassium cyanide in 250 ml. of water was added dropwise to the solution which was kept at a temperature of 15–16° C. throughout the addition. The reaction mixture was then stirred at room temperature for two hours. The thick oil which floated on the surface was extracted with ether. The ether extract was dried over sodium sulfate and the ether evaporated under reduced pressure. The oil was distilled under vacuum. Yield: 61.0 grams, B.P. 152–154° C., at 7.0 mm. A sample of the hydrochloric acid salt of this material was prepared for analytical purposes, M.P. 161–164° C.

Calculated for $C_{10}H_{12}N_2 \cdot HCl$: Cl, 18.03%. Found: Cl, 17.68%.

(b) *N'-(2-phenethyl) ethylene diamine.*—48.0 grams of alpha-(2-phenethylamino) acetonitrile dissolved in 100 ml. of dry ether were added dropwise to a mixture of 11.5 grams of lithium aluminum hydride in 500 ml. of dry ether. The mixture was stirred and heated to reflux for two hours; 26.5 ml. of water were then added dropwise to the mixture which had been previously cooled in an ice and water bath. The inorganic salts were filtered off and the ether evaporated under reduced pressure. The residue was distilled under vacuum. Yield: 17.0 grams, B.P. 134–136° C., at 6 mm. A sample of the hydrochloric acid salt of this material was prepared for analytical purposes. M.P. 263–264° C.

Calculated for $C_{10}H_{16}N_2 \cdot 2HCl$: N, 11.81%; Cl, 29.08%. Found: N, 11.82%; Cl, 29.13%.

(c) *N'-(beta-phenethyl)-N²-phenylacetamido ethylene diamine hydrochloride.*—16.4 grams of N'-(2-phenethyl) ethylene diamine and 17.0 grams of ethylphenylacetate were heated at 250–260° C. for one and one half hours and the ethanol was distilled off as it was formed. The reaction mixture was cooled and the thick oil was dissolved in 100 ml. of ether. The ether solution was poured into cold ethereal hydrogen chloride. The gummy precipitate was crystallized from an acetone and methanol mixture. Yield: 7.0 grams, M.P. 184–186° C.

Calculated for $C_{18}H_{22}N_2O \cdot HCl$: C, 67.8%; H, 7.26%; N, 8.78%; Cl, 11.12%. Found, C, 67.35%; H, 7.24%; N, 8.83%; Cl, 11.62%.

(d) *1-(beta-phenethyl)-2-benzylimidazoline.*—Following the method of Example 8, but using 26.6 grams of N'-(2-phenethyl) ethylene diamine and 27.2 grams of ethylphenylacetate, heating at 250–270° C. for 1.5 hours, and working up as described in Example 8, there were obtained 23.4 grams of the title compound, B.P. 166–176° C. at 0.1 mm. Hg, identified as the hydrochloride salt, M.P. 209–211° C.

Calculated for $C_{18}H_{20}N_2 \cdot HCl$: C, 71.9%; H, 7.04%; Cl, 11.79%. Found: C, 72.11%; H, 7.01; Cl, 11.77%.

EXAMPLE 32

(a) *Alpha-benzylaminopropionitrile.*—107.2 grams (1.0 mole) of benzylamine were added portionwise to 71.01 grams (1.0 mole) of lactonitrile, cooling the reaction mixture between each addition. The mixture was then heated on a steam cone for three hours, 300 ml. of benzene were added and the two layers were separated. The benzene portion was washed with water, dried over sodium sulfate and the solvent evaporated under reduced pressure. The residue was distilled under vacuum. Yield: 111.0 grams, B.P. 131–137° C. at 18 mm. A sample of the hydrochloric acid salt of this material was prepared for analytical purposes, M.P. 150–152° C.

Calculated for $C_{10}H_{12}N_2 \cdot HCl$: Cl, 18.02%. Found: Cl, 19.56%.

(b) *2-benzylaminopropylamine.*—62.0 grams (0.39 mole) of alpha-benzylaminopropionitrile dissolved in 50 cc. of dry ether were added dropwise to a mixture of 15.2 grams (0.4 mole) of lithium aluminum hydride in 500 cc. of dry ether maintaining the temperature of the reactants below 10° C. The mixture was stirred at room temperature for thirty minutes. 10 ml. of water followed by 25 ml. of a 25% sodium hydroxide solution and another 10 cc. of water were added dropwise maintaining the temperature of the reactants below 10° C. The inorganic salts were filtered off and the solvent evaporated under reduced pressure. The residue was distilled under vacuum. Yield: 28.9 grams, B.P. 130–131° C. at 13 mm. A sample of the hydrochloric acid salt of this material was prepared for analytical purposes, M.P. 121–124° C.

Calculated for $C_{10}H_{16}N_2 \cdot 2HCl$: Cl, 29.89%. Found: Cl, 29.66%.

(c) *1-benzyl-2-beta-phenethyl-5-methylimidazoline.*—Following the method of Example 8, but using 27.9 grams (0.17 mole) of 2-benzylaminopropylamine and 25.5 grams (0.17 mole) of hydrocinnamic acid, heating at 250° C. for one hour, and working up as above, there were obtained 35.5 grams of the title compound, B.P. 165–167° C. at 0.06 mm. Hg, identified as the picrate salt, M.P. 123–124° C.

Calculated for $C_{19}H_{22}N_2 \cdot (NO_2)_3C_6H_2OH$: C, 59.17%; H, 4.97%; N, 13.80%. Found: C, 58.93%; H, 4.66%; N, 13.70%.

EXAMPLE 33

*1-(beta-phenethyl)-2-benzyl-5-methylimidazoline*

40.0 grams of 1-(beta-phenethyl)-2-benzyl-5-methylimidazoline, as obtained in Example 3 were placed into a 100 ml. three-neck flask equipped with a stirrer and a condenser. Four B.D.H. 0.5 grams Raney Nickel pellets were added to the oil and the mixture was heated at 260° C. until no more hydrogen was given off, approximately thirty minutes. The product was then distilled under high vacuum, yielding 28.4 grams of the title compound, B.P. 200–212° C. at 0.32 mm. Hg, identified as the hydrochloride salt, M.P. 261–262° C.

Calculated for $C_{19}H_{21}N_2 \cdot HCl$: C, 72.95%; H, 6.77%; N, 8.96%. Found: C, 72.76%; H, 6.50%; N, 8.84%.

We claim:

A phenethylamine derivative selected from the group which consists of a base of the formula

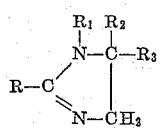

in which R is selected from the group consisting of benzyl, monohydroxybenzyl, methylbenzyl and naphthylmethyl; $R_1$ is β-phenethyl; $R_2$ is selected from the group consisting of hydrogen and alkyl of from one to three carbon atoms; and $R_3$ is selected from the group consisting of hydrogen and methyl; and the hydrochloride and picrate salts thereof.

(References on following page)

References Cited by the Examiner

UNITED STATES PATENTS

| | | | |
|---|---|---|---|
| 2,355,837 | 8/44 | Wilson | 260—309.6 |
| 2,503,285 | 4/50 | McPhee | 260—570.5 |
| 2,505,247 | 4/50 | Isler | 260—309.6 |
| 2,576,311 | 11/51 | Schlesinger et al. | 260—578 |
| 2,577,121 | 12/51 | Goodson | 260—570.5 |
| 2,641,599 | 6/53 | Goldberg et al. | 260—309.6 |
| 2,716,134 | 8/55 | Reynolds et al. | 260—570.5 |
| 2,719,861 | 10/55 | Carboni | 260—465 |
| 2,743,291 | 4/56 | De Benneville | 260—465.5 |
| 2,860,143 | 11/58 | Thompson | 260—309.6 |
| 2,860,164 | 11/58 | Kroll et al. | 260—465.5 |
| 2,867,625 | 1/59 | Ham et al. | 260—309.6 |
| 2,888,314 | 5/59 | Matlin et al. | 260—465 |
| 2,906,772 | 9/59 | Weijlard | 260—465 |
| 2,915,431 | 12/59 | Carron et al. | 260—309.6 |
| 2,937,203 | 5/60 | Fuller | 260—558 |
| 2,991,310 | 7/61 | Phalen | 260—558 |
| 2,993,062 | 7/61 | Noyle et al. | 260—558 |

OTHER REFERENCES

Gaylord: Reduction With Complex Metal Hydrides, pages 731–41, N.Y., Interscience, 1956.

Kyrides et al.: Jour. Org. Chem., vol. 12, pages 577–85 (1947).

Schipper et al.: Elderfield Heterocyclic Compounds, vol. 5, pages 239–40 M, N.Y., Wiley, 1957.

WALTER A. MODANCE, *Primary Examiner.*

DUVAL T. McCUTCHEN, NICHOLAS S. RIZZO,
*Examiners.*

UNITED STATES PATENT OFFICE
CERTIFICATE OF CORRECTION

Patent No. 3,202,674

August 24, 1965

Andre L. Langis et al.

It is hereby certified that error appears in the above numbered patent requiring correction and that the said Letters Patent should read as corrected below.

Column 2, lines 35 to 38, the formula should appear as shown below instead of as in the patent:

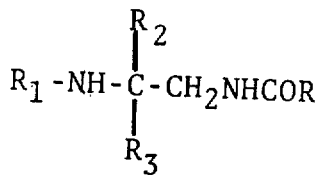

column 4, line 15, for "Calculated for $C_{19}H_{24}N_2O \cdot HCl$: C, 68.8%; H, 7.58%;" read -- Calculated for $C_{19}H_{22}N_2 \cdot HCl$: N, 8.90; Cl, 11.28. Found: N, 8.63; Cl, 10.68. --; line 16, strike out "phenylacetamide as a colorless oily residue."; column 6, lines 43 and 44, for "hydrocarbon" read -- hydrogen --; column 10, line 12, for "3.80 grams (1.0 mode)" read -- 38.0 grams (1.0 mole) --; line 34, for "$C_{20}H_{24}N_2 \cdot 2HCl$:" read -- $C_{20}H_{24}N_2 \cdot HCl$: --; column 13, line 13, for "Cl, 10.778%" read -- Cl, 10.78% --.

Signed and sealed this 26th day of April 1966.

(SEAL)
Attest:

ERNEST W. SWIDER
Attesting Officer

EDWARD J. BRENNER
Commissioner of Patents